UNITED STATES PATENT OFFICE.

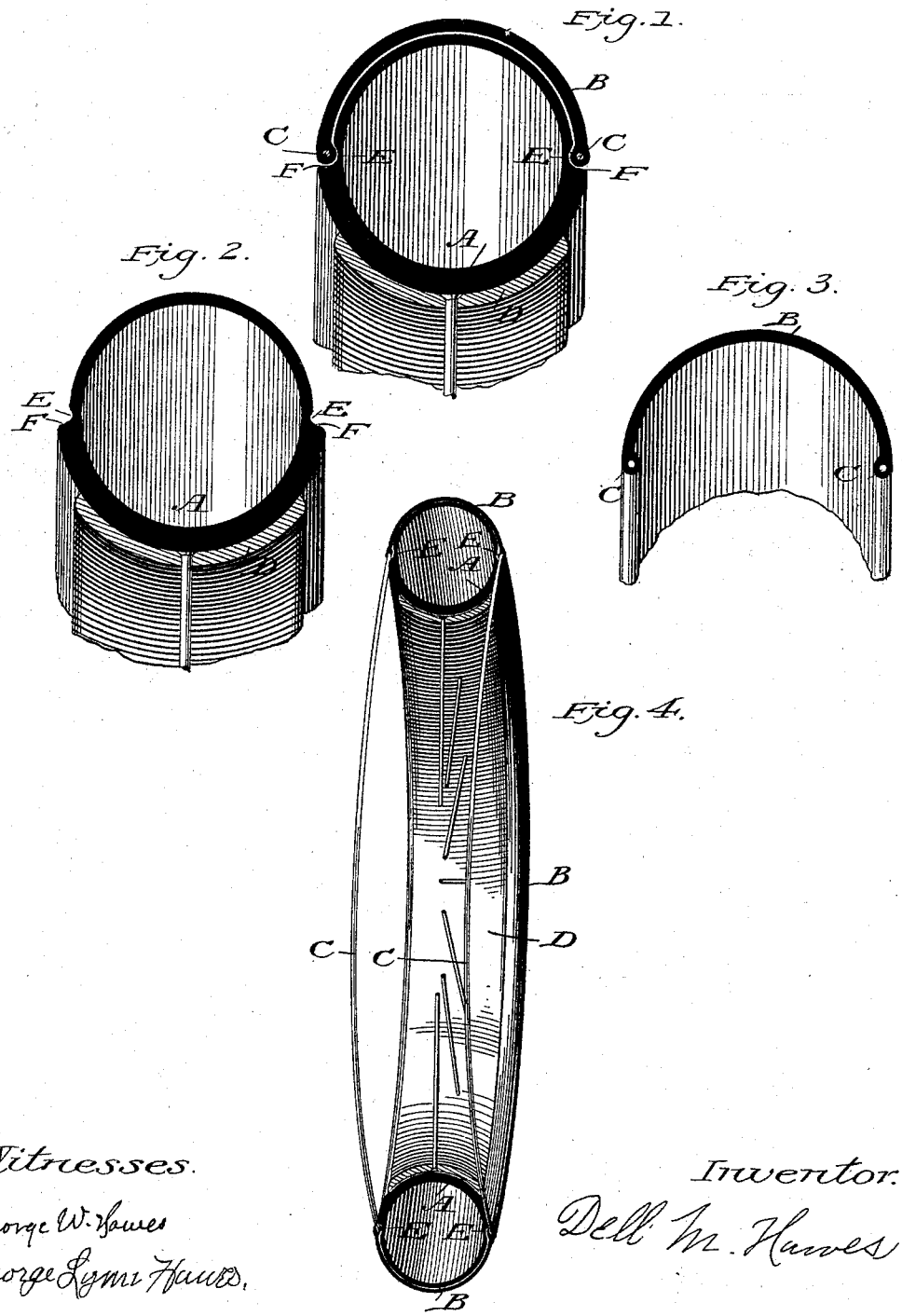

DELL M. HAWES, OF ORTONVILLE, MINNESOTA.

PNEUMATIC TIRE.

SPECIFICATION forming part of Letters Patent No. 526,572, dated September 25, 1894.

Application filed April 28, 1893. Serial No. 472,253. (No model.)

*To all whom it may concern:*

Be it known that I, DELL MERRILL HAWES, a citizen of the United States, residing at Ortonville, in the county of Big Stone and State of Minnesota, have invented a new and useful Improvement in Pneumatic Tires, of which the following is a specification.

My invention relates to what are known as pneumatic tires for bicycles and road carts, and consists of two parts, viz.: an endless hollow inflatable tire to rest on the outer concaved surface of a wheel, also a jacket to cover the outer face of said tire, both tire and jacket to be constructed of rubber cloth, composition or other strong fabric.

Reference is had to the accompanying drawings, forming a part of this specification.

Figure 1, is a cross section of the tire complete. Fig. 2, is a cross section of the tire with cover removed. Fig. 3, is a cross section of the cover. Fig. 4, is a view in perspective of the tire complete.

The tire "A" as shown in Fig. "2" is to be so constructed that its outer longitudinal half will be thinner and more flexible than the inner half thereof, and provided with a shoulder "F" and a groove "E" on either side thereof, adapted to receive and support the edges of a jacket so constructed as to fit and be supported thereby.

The jacket "B" shown in Fig. "3" consists of an endless concaved strip made to fit closely the outer thinner half of the air tube and is constructed with an endless wire running longitudinally one or more times around in either edge thereof "C C," the ends thereof to be united by looping, twisting or welding. The edges of said jacket to be so constructed as to fit and be supported by the grooves "E E" and shoulders "F F," the whole to rest upon the outer concave surface of the rim of the wheel "D."

What I claim as my invention, and desire to secure by Letters Patent, is—

1. In a pneumatic tire, the combination with an endless inflatable air tube so constructed that its outer longitudinal half will be thinner and more flexible than the inner half and provided with a shoulder and groove on either side thereof, of a jacket so constructed as to cover the outer thinner half of the air tube, the edges of said jacket fitting in the groove and supported by the shoulders substantially as shown and described.

2. In a pneumatic tire the combination with a jacket consisting of an endless concaved strip made to fit closely to the outer longitudinal half of the tire with an endless wire running longitudinally one or more times around in either edge thereof, of an inflatable air tube so constructed that its outer longitudinal half will be thinner and more flexible than the inner half and provided with a shoulder and groove on either side thereof adapted to fit and support the edges of the jacket substantially as shown and described.

Ortonville, Minnesota, April 20, 1893.

DELL M. HAWES.

Witnesses:
GEO. W. HAWES,
SADIE SHEELEY.